United States Patent [19]

Shute et al.

[11] Patent Number: 4,713,228
[45] Date of Patent: Dec. 15, 1987

[54] HEAT RECOVERY IN THE MANUFACTURE OF PHOSPHORUS ACIDS

[75] Inventors: Jonathan F. Shute, Lawrence, Kans.; Harvey Rosenhouse, East Windsor, N.J.

[73] Assignee: FMC Corporation, Philadelphia, Pa.

[21] Appl. No.: 926,490

[22] Filed: Nov. 4, 1986

Related U.S. Application Data

[63] Continuation of Ser. No. 497,442, May 23, 1983, abandoned.

[51] Int. Cl.4 .............................................. C01B 25/12
[52] U.S. Cl. ..................................... 423/317; 423/304
[58] Field of Search .................................. 423/304, 317

[56] References Cited

U.S. PATENT DOCUMENTS 4,219,533  8/1980  Hartlapp et al. .................... 423/304
4,379,131  4/1983  Daniel et al. ........................ 423/304

Primary Examiner—John Doll
Assistant Examiner—Wayne A. Langel
Attorney, Agent, or Firm—Robert D. Jackson; Frank Ianno

[57] ABSTRACT

Heat is recovered from the phosphorus combustion chamber of a furnace phosphoric acid plant by placing in the combustion chamber a heat exchange surface having a protective meta acid coating thereon. Pressurized water can be used as a heat exchange fluid.

6 Claims, 2 Drawing Figures

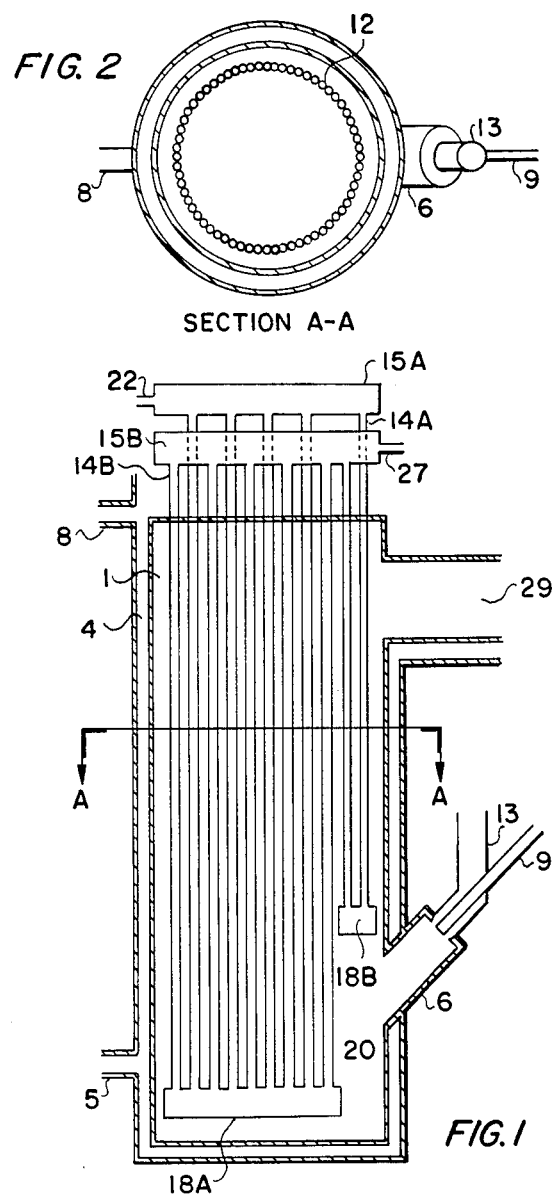

HEAT RECOVERY IN THE MANUFACTURE OF PHOSPHORUS ACIDS

This application is a continuation of application Ser. No. 497,442, filed May 23, 1983, now abandoned.

This invention relates to the manufacture of furnace grade phosphorus acids. More particularly, the invention is concerned with the manufacture of furnace grade phosphoric acid with provision for heat recovery.

In the manufacture of furnace grade phosphorus acids, elemental phosphorus is burned to form phosphorus pentoxide ($P_2O_5$) containing vapors which are then led into a conversion zone where the $P_2O_5$ is recovered by condensation and/or contact with water to give phosphorus acids of the desired type and strength. The burning of the phosphorus is commonly carried out in a chamber of stainless steel or similar inert metal equipped with a phosphorus feed system for spraying liquid phosphorus into the vessel. An oxygen-containing gas, normally air, is admitted into the burner chamber to support combustion of the phosphorus. The outer walls of the chamber are provided with cooling means, such as circulating water. From an opening in the chamber, the $P_2O_5$ vapor is conveyed by way of a connecting duct into the conversion unit, such as a scrubbing tower, for recovery of phosphoric acid.

In most commercial furnace grade phosphoric acid plants of the above described type, the cooling system of the phosphorus burner chamber is so regulated that the temperature of the inner wall surface exposed to the phosphorus flame does not exceed about 100° C. Under these conditions, metaphosphoric acid, which is present in the product stream as a result of the reaction of $P_2O_5$ with moisture in the combustion air, deposits on the chamber walls to form an adherent, protective coating thereon. Metaphosphoric acid, or meta acid as it is familiarly known in the art, is a somewhat generic term applied to polymeric phosphoric acids having a $P_2O_5$ assay above about 85%. The $P_2O_5$ content of meta acid coatings normally found in meta furnaces is around 92 weight percent.

Once the protective coating of meta acid is established, further build up does not occur. Any acid that does deposit on the chamber walls after equilibrium thickness of the coating has been reached is vaporized and carried away with the product gas stream.

Although the above described process for the production of furnace grade phosphoric acid is generally satisfactory, it does not provide for recovery of high quality by-product heat which is evolved from combustion of the phosphorus. This deficiency is recognized in the art and attempts to overcome it have been made. In one such approach, high temperature steam is generated by passing water through a heat exchanger situated in the phosphorus burner chamber. The combustion air is dried to avoid formation of any phosphoric acids lest they cause corrosion due to the high wall temperatures of the heat exchanger. However, this technique would add to the cost and complexity of operating a meta furnace; European Patent Application Publication No. 0 046 865 and Japanese Kokai Patent No. Sho 54[1979]-84890. In another approach, described in U.S. Pat. No. 4,309,394 to Hudson, a heat exchanger is utilized in a combined scheme of condensing ultraphosphoric acid from the product stream and recovering process heat. According to the patent specification and drawing, the heat exchanger is located in a crossunder conduit through which the product stream is conveyed from the burner chamber to the phosphoric acid converter. A requirement of this process is the production and recovery of ultraphosphoric acid. Not only is this limitation an added step, but it depletes the product stream of phosphorus values flowing into the converter. Hudson also requires cooling the gas stream below its dew point in order to condense ultraphosphoric acid as a liquid product that condenses and drips as a continuous stream from the heat exchanger.

In accordance with the present invention, heat is recovered in the manufacture of phosphoric acid by a process comprising (a) burning phosphorus and air in a combustion zone to form a gas stream containing $P_2O_5$ vapors; (b) providing a heat exchange means in said combustion zone in proximity to the burning phosphorus; (c) passing a heat exchange fluid through said heat exchange means to maintain the surface thereof at a temperature no higher than about 1000° F. (538° C.), said surface having thereon a protective, adherent coating of metaphosphoric acid; (d) removing heat from the gas stream, without necessarily cooling the gas stream below its dew point, and (e) conveying the gas stream of $P_2O_5$ containing vapors to a conversion zone for recovery of phosphoric acid.

BRIEF DESCRIPTION OF THE DRAWING

FIG. 1 is a schematic representation depicting a vertical sectional view of a phosphorus burning chamber containing heat exchange tubes for recovering heat from the resulting $P_2O_5$ containing vapors by the process of the invention.

FIG. 2 is a plan view taken through A—A of FIG. 1 showing the circular arrangement of the heat exchanger tubes and the opening for admitting phosphorus and air into the burning chamber.

Turning now to the drawing in which like parts are designated by the same numbers, numeral 1 refers to a conventional phosphorus burning chamber of corrosion resistant metal, such as Type 316 stainless steel. The chamber is of hollow wall construction through which cooling water 4 is circulated by way of openings 5 and 8 to maintain wall temperatures below 100° C. Liquid elemental phosphorus is introduced into the chamber 1 from the burner nozzle 9 which is surrounded by pipe 13 for supplying combustion air to the atomized phosphorus. Nozzle 9 and air supply pipe 13 assembly are a conventional phosphorus-atomizing burner mounted on duct 6 which communicates with the inside of chamber 1. $P_2O_5$ containing vapors from burning phosphorus pass upwardly through chamber 1 which contains a circular bundle of vertically disposed heat exchange tubes 12 divided into two banks, designated 14a and 14b. Tubes in bank 14a are connected at their upper ends to intake manifold 15a. Tubes in bank 14b are connected at their upper ends to discharge manifold 15b. The lower extremities of the tubes terminate at headers 18a and 18b. Heat exchanger tubes opposite duct 6 are shortened to provide opening 20 for the entry of the phosphorus flame. In effect, the phosphorus flame is surrounded by the circular bundle of vertically disposed heat exchange tubes. A heat exchange fluid enters intake manifold 15a through inlet 22 and passes downwardly through tube bank 14a into header 18a and 18b and thence upwardly through tube bank 14b into discharge manifold 15b and exits via outlet 27 where the heat exchange fluid can be recovered. The vaporous $P_2O_5$ product exits from chamber 1 through opening 29 whence they are conveyed to a $P_2O_5$ scrubbing unit or other conversion zone.

Alternate heat exchange means can also be used in the combustion zone. For example, the combustion chamber itself could provide the heat recovery exchange surface through conventional designs such as a water wall.

The flow of the heat exchange fluid is so controlled that the outer wall temperature of the heat exchange tubes does not exceed about 1000° F. (538° C.). However, even at these high wall temperatures, it has been found that an adherent, protective film of metaphosphoric acid deposits and maintains itself on the heat exchange surface in the combustion zone. Once established, the film does not continue to build up although it may vary somewhat in thickness in response to changes in the temperature of the heat exchanger surfaces and/or the combustion chamber. Beyond this equilibrium meta coating thickness, any more $P_2O_5$ containing vapors condensing on the heat exchanger surfaces will revaporize and exit from the combustion zone in the product gas stream. It is thus evident that subsequent to the film formation, heat can be recovered from the product stream without resorting to condensing and recovering $P_2O_5$ values in the form of ultraphosphoric acid as required by prior workers, for example, Hudson. This eliminates possible operating problems associated with the collection of ultraphosphoric acid and can give greater product flexibility in the downstream scrubbing equipment.

As pointed out in the Hudson patent aforesaid (column 1, lines 52-68), the contact of metaphosphoric acid with metal surfaces at elevated temperatures is, according to the prior art, particularly corrosive. It is to avoid such corrosive attack that the walls of phosphorus combustion chambers are maintained below 100° C. in operating metaphosphate furnaces. Under these conditions, an adherent surface coating of metaphosphoric acid is formed and retained on the chamber walls. This meta acid coating when in contact with the walls at below 100° C. is not especially corrosive. It is, therefore, surprising and unexpected that such meta acid protection of the heat exchanger surfaces located directly in the combustion zone could be realized at the relatively high wall temperatures—upwards of 1000° F. (538° C.)—prevailing in the process herein.

Generally speaking, the combustion air will contain adequate moisture to permit formation and deposition of the meta coating. Such conditions are satisfactorily fulfilled where the $H_2O/P_2O_5$ mole ratio is in the range of 1:1 to 1:5. Maintenance of the $H_2O/P_2O_5$ ratio may require some adjustment in the moisture content of the combustion air when operating under extreme conditions of low humidity. Normally, however, there is no need to adjust the $H_2O/P_2O_5$ ratio.

The invention is illustrated further by the following examples.

EXAMPLE 1

A U-tube was inserted one foot into the gas stream at the top of a commercial phosphorus burning chamber. Steam flowed through the tube at a rate of 132 lbs/hr. Steam pressure and temperature upstream of the tube were 31 psig and 435° F., respectively. Steam temperature at the tube outlet was 558° F. Heat flux through the tube wall was 9000 Btu/hr.-sq. ft. The tube was exposed to the hot gases for four operating months with no attempt to control the humidity of the combustion air. Examination of the tube showed that, at surface temperatures of 1000° F. or lower, a metaphosphoric acid coating was formed and retained on the tube. Corrosion was negligible.

EXAMPLE 2

A U-tube was inserted through the top of a commercial phosphorus burning chamber and extended the entire length of the furnace. Superheated water flowed through the tube at a rate of 4600 lbs/hr. Water pressure and temperature upstream of the tube were 200 psig and 207° F. Water temperature at the tube outlet was 354° F. Measured heat fluxes through the tube wall varied from 24,000 to 97,000 Btu/ft.$^2$hr. The tube was exposed inside the furnace for six months of normal furnace operation without having to control combustion air humidity. Examination of the tube showed that, at surface temperatures of 450° F. or lower, a metaphosphoric acid coating was formed and retained on the tube. Corrosion was negligible.

What is claimed is:

1. A process of producing phosphoric acid with heat recovery comprising:
   (a) burning phosphorus and air in a combustion zone to form a gas stream containing $P_2O_5$ vapors;
   (b) providing a heat exchange means in said combustion zone in proximity to the burning phosphorus;
   (c) passing a heat exchange fluid through said heat exchange means to maintain the outer surface thereof at a temperature no higher than about 1000° F. (538° C.), said surface having thereon a protective, adherent coating of metaphosphoric acid;
   (d) removing heat from the gas stream, without cooling the gas stream below its dew point; and
   (e) conveying the gas stream of $P_2O_5$ containing vapors to a conversion zone for recovery of phosphoric acid.

2. A process according to claim 1 wherein the temperature of the surface of the heat exchanger ranges from about 400° F. to about 850° F.

3. A process according to claim 1 wherein heat is removed from the product stream by circulating pressurized water through the cooling surface.

4. A process according to claim 1 wherein the mole ratio of $H_2O/P_2O_5$ in the gas stream ranges from 1:1 to 1:5.

5. A process according to claim 1 wherein the heat exchange means is a circular tube bundle.

6. A process according to claim 1 wherein the heat exchange means is part of the combustion chamber.

* * * * *